US011117981B2

(12) United States Patent
Kim et al.

(10) Patent No.: US 11,117,981 B2
(45) Date of Patent: Sep. 14, 2021

(54) PHOTOPOLYMER COMPOSITION

(71) Applicant: LG CHEM, LTD., Seoul (KR)

(72) Inventors: Heon Kim, Daejeon (KR); Boo Kyung Kim, Daejeon (KR); Seok Hoon Jang, Daejeon (KR); Yeong Rae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/326,150

(22) PCT Filed: Jul. 2, 2018

(86) PCT No.: PCT/KR2018/007476
§ 371 (c)(1),
(2) Date: Feb. 15, 2019

(87) PCT Pub. No.: WO2019/017615
PCT Pub. Date: Jan. 24, 2019

(65) Prior Publication Data
US 2019/0185592 A1    Jun. 20, 2019

(30) Foreign Application Priority Data

Jul. 17, 2017 (KR) .................... 10-2017-0090560

(51) Int. Cl.
| | |
|---|---|
| *C08F 2/50* | (2006.01) |
| *C08G 83/00* | (2006.01) |
| *G06K 19/16* | (2006.01) |
| *G02B 5/32* | (2006.01) |
| *C08F 283/02* | (2006.01) |
| *C08F 220/18* | (2006.01) |
| *C08F 283/00* | (2006.01) |
| *C08G 18/64* | (2006.01) |
| *C08G 18/32* | (2006.01) |
| *C08G 18/72* | (2006.01) |
| *C08G 18/71* | (2006.01) |
| *C08G 18/42* | (2006.01) |
| *C08F 2/48* | (2006.01) |
| *C09D 4/06* | (2006.01) |
| *C08F 222/10* | (2006.01) |

(52) U.S. Cl.
CPC ............ *C08F 2/50* (2013.01); *C08F 2/48* (2013.01); *C08F 220/18* (2013.01); *C08F 222/1006* (2013.01); *C08F 283/006* (2013.01); *C08G 18/3206* (2013.01); *C08G 18/3212* (2013.01); *C08G 18/4269* (2013.01); *C08G 18/6484* (2013.01); *C08G 18/71* (2013.01); *C08G 18/72* (2013.01); *C08G 83/00* (2013.01); *C08G 83/007* (2013.01); *C09D 4/06* (2013.01); *G06K 19/16* (2013.01); *G02B 5/32* (2013.01)

(58) Field of Classification Search
CPC ........ C08F 2/50; C08F 222/1006; C08F 2/48; C08F 220/18; C08G 83/007; C08G 83/00; C08G 18/4269; C09D 4/06; C09D 175/04
See application file for complete search history.

(56) References Cited

U.S. PATENT DOCUMENTS

| | | | | |
|---|---|---|---|---|
| 2004/0041287 A1* | 3/2004 | Engardio | .............. | B29C 39/006 264/1.7 |
| 2007/0138664 A1* | 6/2007 | Chen | .................. | B29D 11/0073 264/1.32 |
| 2007/0138667 A1* | 6/2007 | Dang | .............. | B29D 11/00009 264/1.32 |
| 2009/0215919 A1 | 8/2009 | Ito et al. | | |
| 2009/0281213 A1 | 11/2009 | Ito et al. | | |
| 2010/0160554 A1 | 6/2010 | Okahira | | |
| 2012/0231376 A1 | 9/2012 | Rölle et al. | | |
| 2012/0302659 A1 | 11/2012 | Rölle et al. | | |
| 2014/0080936 A1 | 3/2014 | Kim et al. | | |
| 2015/0240109 A1 | 8/2015 | Kang et al. | | |
| 2015/0353485 A1 | 12/2015 | Hagen et al. | | |
| 2016/0297178 A1 | 10/2016 | Kang et al. | | |
| 2016/0304690 A1 | 10/2016 | Takemoto et al. | | |
| 2017/0056731 A1 | 3/2017 | Tarao et al. | | |
| 2017/0145137 A1 | 5/2017 | Yamada et al. | | |
| 2018/0030341 A1* | 2/2018 | Shimizu | .................. | G02B 5/23 |

FOREIGN PATENT DOCUMENTS

| | | | | |
|---|---|---|---|---|
| CN | 101052658 A | 10/2007 | | |
| CN | 106046303 A | 10/2016 | | |
| CN | 106474680 A | 3/2017 | | |
| CN | 107207851 A | 9/2017 | | |
| JP | 2011-046917 | * 3/2011 | ............ | C08F 299/00 |
| JP | 5386702 B2 | 1/2014 | | |
| JP | 2015-066883 A | 4/2015 | | |
| JP | 2016-69398 A | 5/2016 | | |
| JP | 2016-538160 A | 12/2016 | | |
| JP | 6069294 B2 | 2/2017 | | |
| KR | 10-0865781 B1 | 10/2008 | | |
| KR | 10-0977933 B1 | 8/2010 | | |
| KR | 10-2012-0124430 A | 11/2012 | | |
| KR | 10-2013-0008537 A | 1/2013 | | |
| KR | 10-2013-0132336 A | 12/2013 | | |

(Continued)

OTHER PUBLICATIONS

Ruslim et al., machine English translation of JP 2011-046917 (Year: 2011).*

(Continued)

*Primary Examiner* — Jessica M Roswell
(74) *Attorney, Agent, or Firm* — Dentons US LLP

(57) ABSTRACT

The present invention relates to a photopolymer composition comprising: a polymer matrix or a precursor thereof including a reaction product of a polyol including a polyrotaxane compound and a compound containing at least one isocyanate group; a photoreactive monomer; and a photoinitiator. The present invention also relates to a hologram recording medium produced from the photopolymer composition, an optical element comprising the hologram recording medium, and a holographic recording method using the photopolymer composition.

11 Claims, 2 Drawing Sheets

(56) References Cited

FOREIGN PATENT DOCUMENTS

| | | |
|---|---|---|
| KR | 10-2014-0027020 A | 3/2014 |
| KR | 10-1443846 B1 | 9/2014 |
| KR | 10-2015-0111958 A | 10/2015 |
| KR | 10-2017-0065820 A | 6/2017 |
| KR | 10-2017-0097372 A | 8/2017 |
| WO | 2015/012020 A1 | 1/2015 |
| WO | 2015/174187 A1 | 11/2015 |
| WO | 2016/072356 A1 | 5/2016 |
| WO | 2016/143910 A1 | 9/2016 |

OTHER PUBLICATIONS

Lee, machine English translation of KR 10-2017-0065820 (Year: 2017).*
Ota, machine English translation of JP 2015-066883 (Year: 2015).*
SeRM Super Polymer, SH 3400, AMS Inc. Website, Apr. 14, 2020, pp. 1-4.

* cited by examiner

[FIG. 1]
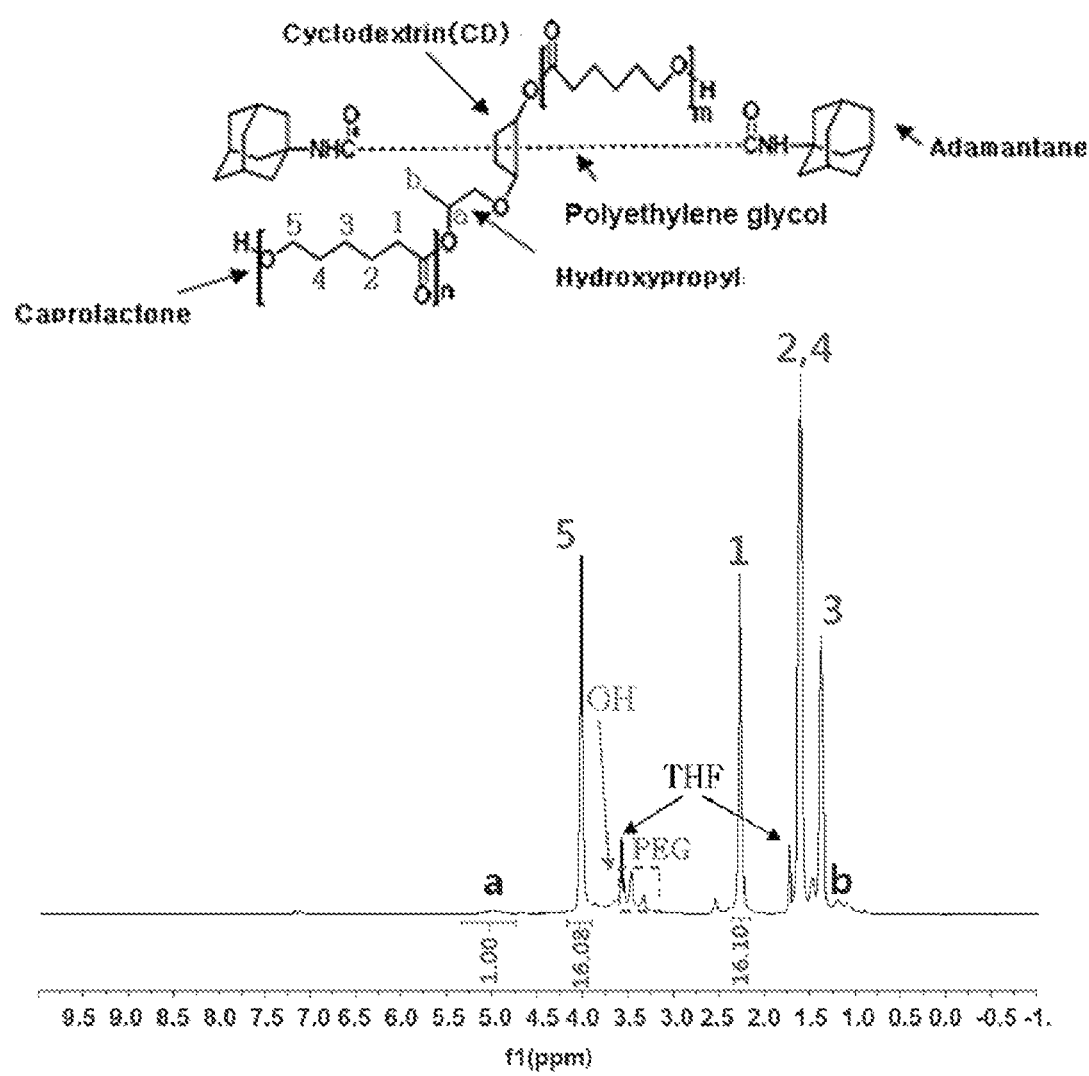

[FIG. 2]
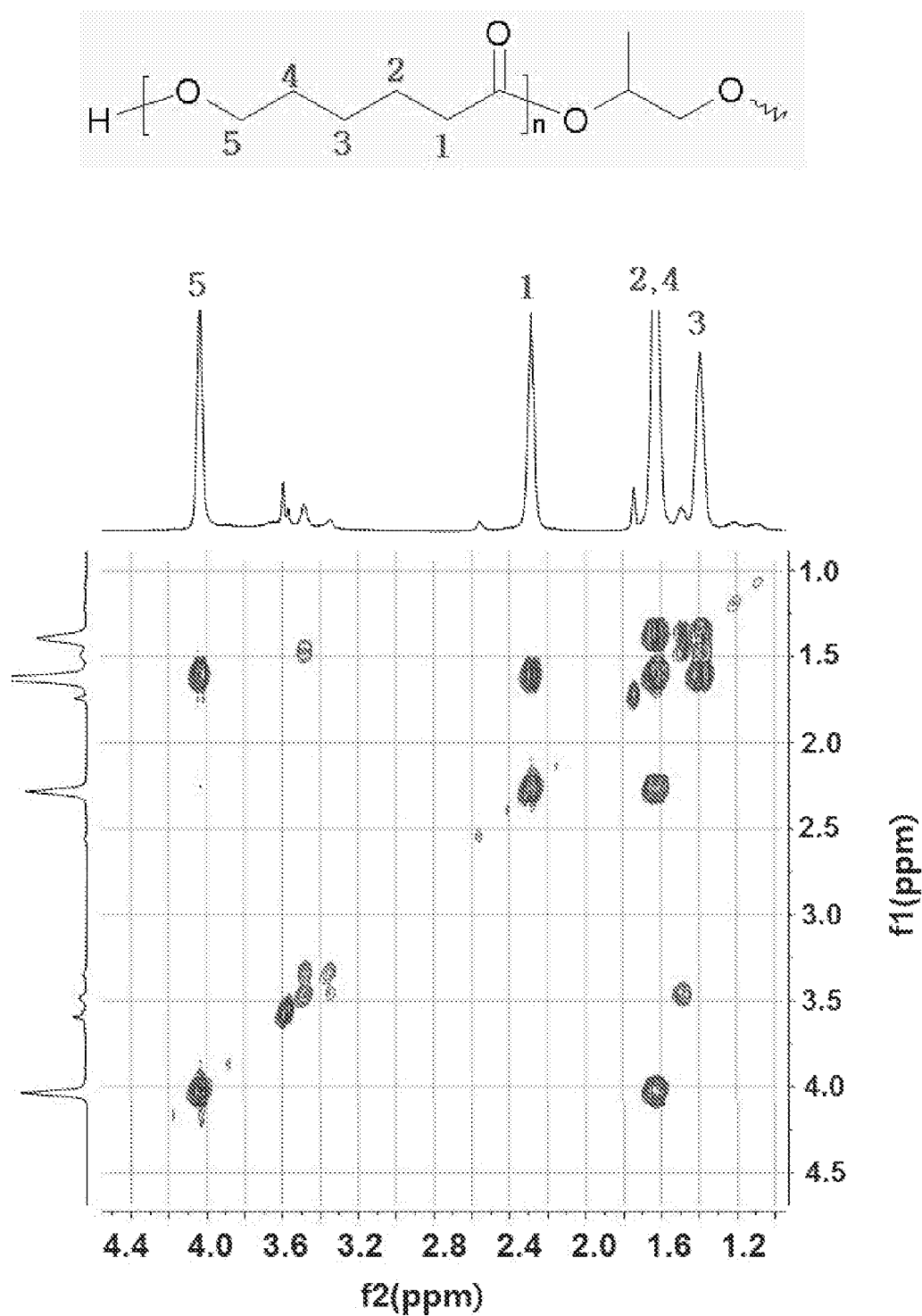

PHOTOPOLYMER COMPOSITION

CROSS-REFERENCE TO RELATED APPLICATION(S)

This application is a National Stage Application of International Application No. PCT/KR2018/007476 filed on Jul. 2, 2018, which claims priority to and the benefits of Korean Patent Application No. 10-2017-0090560, filed on Jul. 17, 2017, with the Korean Intellectual Property Office, the disclosure of which is incorporated herein by reference in its entirety.

TECHNICAL FIELD

The present invention relates to a photopolymer composition, a hologram recording medium, an optical element and a holographic recording method.

BACKGROUND ART

Hologram recording medium records information by changing a refractive index in the holographic recording layer in the medium through an exposure process, reads the variation of refractive index in the medium thus recorded, and reproduces the information.

When a photopolymer (photosensitive resin) is used, the light interference pattern can be easily stored as a hologram by photopolymerization of the low molecular weight monomer. Therefore, the photopolymer can be used in various fields such as optical lenses, mirrors, deflecting mirrors, filters, diffusing screens, diffraction elements, light guides, waveguides, holographic optical elements having projection screen and/or mask functions, medium of optical memory system and light diffusion plate, optical wavelength multiplexers, reflection type, transmission type color filters, and the like.

Typically, a photopolymer composition for hologram production comprises a polymer binder, a monomer, and a photoinitiator, and the photosensitive film produced from such a composition is irradiated with laser interference light to induce photopolymerization of local monomers.

In a portion where a relatively large number of monomers are present in such photopolymerization process, the refractive index becomes high. And in a portion where a relatively large number of polymer binders are present, the refractive index is relatively lowered and thus the refractive index modulation occurs, and a diffraction grating is generated by such refractive index modulation.

The refractive index modulation value $\Delta n$ is influenced by the thickness and the diffraction efficiency (DE) of the photopolymer layer, and the anglular selectivity increases as the thickness decreases.

Recently, development of materials capable of maintaining a stable hologram with a high diffraction efficiency has been demanded, and also various attempts have been made to manufacture a photopolymer layer having a thin thickness and a large value of refractive index modulation.

DETAILED DESCRIPTION OF THE INVENTION

Technical Problem

It is an object of the present invention to provide a photopolymer composition which can more easily provide a photopolymer layer having a large value of refractive index modulation even while having a thin thickness.

It is another object of the present invention to provide a hologram recording medium comprising a photopolymer layer having a large value of refractive index modulation even while having a thin thickness.

It is still another object of the present invention to provide an optical element comprising the above-described hologram recording medium.

It is a further object of the present invention to provide a holographic recording method comprising selectively polymerizing photoreactive monomers contained in the photopolymer composition using an electromagnetic radiation.

Technical Solution

One embodiment of the present invention provides a photopolymer composition comprising: a polymer matrix or a precursor thereof including a reaction product of a polyol and a compound containing at least one isocyanate group, where the polyol includes a polyrotaxane compound comprising a cyclic compound to which a lactone-based compound is bonded, a linear molecule penetrating the cyclic compound, and a blocking group arranged at both ends of the linear molecule which prevents the cyclic compound from escaping; a photoreactive monomer; and a photoinitiator.

Another embodiment of the present invention provides a hologram recording medium produced from the above-described photopolymer composition.

Still another embodiment of the present invention provides an optical element comprising the above-described hologram recording medium.

A further embodiment of the present invention provides a holographic recording method comprising selectively polymerizing photoreactive monomers contained in the photopolymer composition using an electromagnetic radiation Hereinafter, a photopolymer composition, a hologram recording medium, an optical element, and a holographic recording method according to a specific embodiment of the present invention will be described in more detail.

As used herein, the term "(meth)acrylate" refers to either methacrylate or acrylate.

Further, the term "hologram" as used herein refers to a recording medium in which optical information is recorded in an entire visible range and a near ultraviolet range (300 to 800 nm) through an exposure process, and examples thereof include all of visual holograms such as in-line (Gabor) holograms, off-axis holograms, full-aperture transfer holograms, white light transmission holograms ("rainbow holograms"), Denisyuk holograms, off-axis reflection holograms, edge-lit holograms or holographic stereograms.

According to one embodiment of the present invention, there may be provided a photopolymer composition comprising: a polymer matrix or a precursor thereof including a reaction product between a polyol including a polyrotaxane compound comprising a cyclic compound to which a lactone-based compound is bonded, a linear molecule penetrating the cyclic compound, and a blocking group arranged at both ends of the linear molecule and preventing the cyclic compound from escaping, and a compound containing at least one isocyanate group; a photoreactive monomer; and a photoinitiator.

The present inventors have found through experiments that holograms formed from the photopolymer composition comprising a polymer matrix using a polyol including a polyrotaxane compound can achieve remarkably improved refractive index modulation values and diffraction efficiency even in thinner thickness ranges as compared with holograms previously known in the art, thereby completing the present invention.

More specifically, the polyrotaxane compound is a chemically cross-linked thermosetting polymer, but has structural characteristics that the cross-link point can move along the polymer chain due to a pulley effect, and thus the polymer chain can equally maintain its tension in an equilibrium state, and it is possible to disperse the entire structure and stress unevenness of the crosslinking matrix.

Accordingly, when the movement of the photoreactive monomer occurs in order to be recorded in a cross-linked polyrotaxane matrix, the softness or flexibility of the matrix is increased, so that the photopolymerization efficiency can be increased, thereby, there is a feature that the performance as a hologram recording medium can be improved finally.

In addition, this is eventually an effect of increasing the mobility of the photoreactive monomer, which may thus result in an increase in the sensitivity of the photopolymer.

In addition, the photopolymer coating layer recorded by the self-healing property of the polyrotaxane compound itself can have a self-healing characteristic against external scratches.

The hologram produced from the photopolymer composition can realize a refractive index modulation value (Δn) of 0.009 or more or 0.010 or more even at a thickness of 5 μm to 30 μm.

Further, the hologram produced from the photopolymer composition can realize a diffraction efficiency of 50% or more, or 85% or more at a thickness of 5 μm to 30 μm.

A polyrotaxane refers to a compound in which a dumbbell shaped molecule and a macrocycle are structurally interlocked, wherein the dumbbell shaped molecule includes a constant linear molecule and a blocking group arranged at both ends of the linear molecule, the linear molecule penetrates the inside of the cyclic compound, and the cyclic compound can move along the linear molecule and be prevented from escaping by the blocking group.

The cyclic compound can be used without particular limitation so long as it has a size enough to penetrate or surround the linear molecule, and it may also include a functional group such as a hydroxyl group, an amino group, a carboxyl group, a thiol group or an aldehyde group that can react with other polymers or compounds.

Specific examples of these cyclic compounds include α-cyclodextrin and β-cyclodextrin, γ-cyclodextrin, and a mixture thereof.

The lactone-based compound bonded to the cyclic compound may be directly bonded to the cyclic compound, or may be bonded via a linear or branched oxyalkylene group having 1 to 10 carbon atoms.

The functional group mediating such bond may be determined depending on the kind of the functional group substituted in the cyclic compound or the lactone-based compound, or the kind of the compound used in the reaction of the cyclic compound and the lactone-based compound.

The lactone-based compound may include a lactone-based compound having 3 to 12 carbon atoms or a polylactone-based compound containing a lactone-based repeating unit having 3 to 12 carbon atoms.

In the polyrotaxane compound, the residue of the lactone-based compound may include a functional group represented by the following Chemical Formula 1.

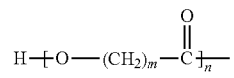

[Chemical Formula 1]

in Chemical Formula 1, m is an integer of 2 to 11, preferably an integer of 3 to 7, and n is an integer of 1 to 20, preferably an integer of 1 to 10.

As the linear molecule, a compound having a linear form can be used without particular limitation as long as it has a molecular weight over a certain value, but it is preferable to use a polyalkylene-based compound or a polylactone-based compound.

Specifically, a polyoxyalkylene-based compound containing an oxyalkylene repeating unit having 1 to 8 carbon atoms or a polylactone-based compound having a lactone-based repeating unit having 3 to 10 carbon atoms can be used.

Further, the linear molecule may have a weight average molecular weight of 1,000 to 50,000.

If the weight average molecular weight of the linear molecule is too low, the coating material produced using the same may not have sufficient mechanical properties or self-healing capability, and if the weight average molecular weight is too high, compatibility of the prepared coating material may be lowered, or the appearance characteristic and uniformity of the material may be significantly lowered.

Meanwhile, the blocking group can be appropriately controlled depending on the properties of the prepared polyrotaxane compound, and for example, at least one or two selected from the group consisting of a dinitrophenyl group, a cyclodextrin group, an adamantane group, a trilyl group, a fluorescein group, and a pyrene group may be used.

The polyrotaxane compound having the aforementioned specific structure may have a weight average molecular weight of 100,000 to 800,000, preferably 200,000 to 700,000, and more preferably 350,000 to 650,000.

If the weight average molecular weight of the polyrotaxane compound is too low, a coating material prepared using the same may not have sufficient mechanical properties or self-healing capability, and if the weight average molecular weight is too high, compatibility of the prepared coating material may be lowered, or the appearance characteristic or uniformity of the material may be significantly lowered.

When a lactone-based compound is bonded to the cyclic compound, a large number of hydroxy (—OH) may be present in the polyrotaxane molecule.

The polymer matrix may serve as a support for the final product such as the photopolymer composition and a film produced therefrom. In the hologram formed from the photopolymer composition, it may serve as a portion having a different refractive index to enhance the refractive index modulation.

As described above, the polymer matrix may include a reaction product between a polyol including a polyrotaxane compound comprising a cyclic compound to which a lactone-based compound is bonded; a linear molecule penetrating the cyclic compound; and a blocking group arranged at both ends of the linear molecule and preventing the cyclic compound from escaping, and a compound containing at least one isocyanate group.

Thus, the precursor of the polymer matrix includes a monomer or an oligomer forming the polymer matrix. Specifically, it may include a polyol including a polyrotaxane compound, and a compound containing at least one isocyanate group.

Details of the polyrotaxane compound are as explained above.

The compound containing at least one isocyanate group may be a known compound having an average of one or more NCO functional groups per molecule or a mixture thereof, or may be a compound containing at least one isocyanate group.

More specifically, the compound containing at least one isocyanate group may include an aliphatic, cycloaliphatic, aromatic or aromatic-aliphatic mono-isocyanate, di-isocyanate, tri-isocyanate or poly-isocyanate; or oligo-isocyanate or poly-isocyanate of diisocyanate or triisocyante having urethane, urea, carbodiimide, acylurea, isocyanurate, allophanate, biuret, oxadiazinetrione, uretdione or iminooxadiazinedione structures.

Specific examples of the compound containing at least one isocyanate group include butylene diisocyanate, hexamethylene diisocyanate (HDI), isophorone diisocyanate (IPDI), 1,8-diisocyanato-4-(isocyanatomethyl)octane, 2,2,4- and/or 2,4,4-trimethylhexamethylene diisocyanate, isomeric bis(4,4'-isocyanato-cyclohexyl)methanes or their mixtures of any desired isomer content, isocyanatomethyl-1,8-octane diisocyanate, 1,4-cyclohexylene diisocyanate, isomeric cyclohexane dimethylene diisocyanate, 1,4-phenylene diisocyanate, 2,4- and/or 2,6-toluene diisocyanate, 1,5-naphthylene diisocyanate, 2,4'- or 4,4'-diphenylmethane diisocyanate and/or triphenylmethane 4,4',4"-triisocyanate or the like.

Meanwhile, the polyol reacting with the compound containing at least one isocyanate group to form a polymer matrix may further include diols, triols or polyols, in addition to the polyrotaxane compound.

More specifically, the polyol reacting with the compound containing at least one isocyanate group to form a polymer matrix may further include at least one selected from the group consisting of aliphatic aromatic diols, triols or polyols having 2 to 20 carbon atoms; alicyclic diols, triols or polyols having from 4 to 30 carbon atoms; and aromatic diols, triols or polyols having 6 to 30 carbon atoms, in addition to the polyrotaxane compound.

The aforementioned photopolymer composition may further include a polyol in addition to the polyrotaxane compound, thus more easily controlling the cross-link point in the polymer matrix of the hologram and further increasing the degree of crosslinking of the polymer matrix. Even in this case, the hologram prepared from the photopolymer composition of the embodiment may have high refractive index modulation value and diffraction efficiency even in a thin thickness range.

Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, positional isomers of diethyloctanediols, 1,3-butylene glycol, cyclohexanediol, 1,4-cyclohexane-dimethanol, 1,6-hexanediol, 1,2- and 1,4-cyclohexanediol, hydrogenated bisphenol A (2,2-bis(4-hydroxycyclohexyl)propane) and 2,2-dimethyl-3-hydroxypropyl, 2,2-dimethyl-3-hydroxypropionate.

Further, examples of triols are trimethylolethane, trimethylolpropane or glycerol.

Suitable alcohols of higher functionality are ditrimethylolpropane, pentaerythritol, dipentaerythritol or sorbitol.

Further, as the polyols, aliphatic and cycloaliphatic polyols having a relatively large molecular weight, such as polyester polyols, polyether polyols, polycarbonate polyols, hydroxy-functional acrylic resins, hydroxy-functional polyurethanes, hydroxy-functional epoxy resins and the like can be used.

The polyester polyols are, for example, linear polyester diols, as obtained in a known manner from aliphatic, cycloaliphatic or aromatic di- or polycarboxylic acid or their anhydride, for example, succinic acid, glutaric acid, adipic acid, pimelic acid, suberic acid, azelaic acid, sebacic acid, nonanedicarboxylic acid, decanedicarboxylic acid, terephthalic acid, isophthalic acid, o-phthalic acid, tetrahydrophthalic acid, hexahydrophthalic acid or trimellitic acid, and acid anhydrides such as o-phthalic anhydride, trimellitic anhydride or succinic anhydride, or any mixtures thereof, by using polyhydric alcohols such as ethanediol, di-, tri- or tetraethylene glycol, 1,2-propanediol, di-, tri- or tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcyclohexane, 1,8-octanediol, 1,10-decanediol, 1,12-dodecanediol, or a mixture thereof, and optionally, simultaneously using higher functional polyols such as trimethylol propane or glycerol.

Of course, cyclic aliphatic and/or aromatic di- and polyhydroxy compounds are suitable as polyhydric alcohols for the preparation of polyester polyols.

Instead of the free polycarboxylic acids, the corresponding polycarboxylic acid anhydrides of the lower alcohols or the corresponding polycarboxylates, or mixtures thereof can also be used for the production of the polyesters.

Further, the polyester polyols that can be used in the synthesis of the polymer matrix include homo- or copolymers of lactones, which are preferably obtained by an addition of lactones or lactone mixtures, such as butyrolactone, ε-caprolactone and/or methyl-ε-caprolactone, onto suitable bifunctional and/or higher functional initiator molecules, such as the aforementioned polyhydric alcohols having a small molecular weight as the synthetic component for the polyester polyols.

Further, the polycarbonates having hydroxyl groups are also suitable as polyhydroxy components for prepolymer synthesis, those which can be prepared by reaction of diols such as 1,4-butanediol and/or 1,6-hexanediol and/or 3-methylpentanediol with diaryl carbonates, e.g. diphenyl carbonate, dimethyl carbonate or phosgene.

Further, the polyether polyols that can be used for the synthesis of the polymer matrix may be, for example, the polyaddition products of the styrene oxides, of ethylene oxide, of propylene oxide, of tetrahydrofuran, of butylene oxide, or of epichlorohydrin, and the mixed addition and grafting products thereof, and also the polyether polyols obtained by condensation of polyhydric alcohols or mixtures thereof and those obtained by alkoxylation of polyhydric alcohols, amines and amino alcohols.

Specific examples of the polyether polyols include poly (propylene oxide)s, poly(ethylene oxides) and combinations thereof in the form of random or block copolymers, or poly(tetrahydrofuran)s and mixtures thereof having an OH functionality of 1.5 to 6 and a number average molecular weight between 200 and 18000 g/mol, preferably an OH functionality of 1.8 to 4.0 and a number average molecular weight between 600 and 8000 g/mol, particularly preferably an OH functionality of 1.9 to 3.1 and a number average molecular weight between 650 and 4500 g/mol.

Meanwhile, the photoreactive monomer may include a polyfunctional (meth)acrylate monomer or a monofunctional (meth)acrylate monomer.

As described above, in a portion where the monomer is polymerized in the process of photopolymerization of the photopolymer composition and the polymer is present in relatively large amounts, the refractive index becomes high. In a portion where the polymer binder is present in relatively large amounts, the refractive index becomes relatively low, the refractive index modulation occurs, and a diffraction grating is generated by such refractive index modulation.

Specifically, one example of the photoreactive monomer may include (meth)acrylate-based α,β-unsaturated carboxylic acid derivatives, for example, (meth)acrylate, (meth)acrylamide, (meth)acrylonitrile, (meth)acrylic acid or the like, or a compound containing a vinyl group or a thiol group.

One example of the photoreactive monomer may include a polyfunctional (meth)acrylate monomer having a refractive index of 1.5 or more. The polyfunctional (meth)acrylate monomer having a refractive index of 1.5 or more may include a halogen atom (bromine, iodine, etc.), sulfur (S), phosphorus (P), or an aromatic ring.

More specific examples of the polyfunctional (meth)acrylate monomer having the refractive index of 1.5 or more include bisphenol A modified diacrylate type, fluorene acrylate type, bisphenol fluorene epoxy acrylate type (HR6100, HR6060, HR6042, etc.—Miwon Specialty Chemical Co., Ltd.), halogenated epoxy acrylate type (HR1139, HR3362, etc.—Miwon), or the like.

Another example of the photoreactive monomer may include a monofunctional (meth)acrylate monomer.

The monofunctional (meth)acrylate monomer may contain an ether bond and a fluorene functional group in the molecule. Specific examples of such monofunctional (meth)acrylate monomer include phenoxybenzyl (meth)acrylate, o-phenylphenol ethylene oxide (meth)acrylate, benzyl (meth)acrylate, 2-(phenylthio)ethyl (meth)acrylate, biphenylmethyl (meth)acrylate, or the like.

Meanwhile, the photoreactive monomer may have a weight average molecular weight of 50 g/mol to 1000 g/mol, or 200 g/mol to 600 g/mol.

The weight average molecular weight means a weight average molecular weight in terms of polystyrene measured by GPC method.

Meanwhile, the photopolymer composition of the embodiment includes a photoinitiator.

The photoinitiator is a compound which is activated by light or actinic radiation and initiates polymerization of a compound containing a photoreactive functional group such as the photoreactive monomer.

As the photoinitiator, commonly known photoinitiators can be used without particular limitation, but specific examples thereof include a photoradical polymerization initiator and a photocationic polymerization initiator.

Specific examples of the photoradical polymerization initiator include imidazole derivatives, bisimidazole derivatives, N-aryl glycine derivatives, organic azide compounds, titanocene, aluminate complex, organic peroxide, N-alkoxypyridinium salts, thioxanthone derivatives, or the like.

More specifically, examples of the photoradical polymerization initiator include 3-di(t-butyldioxycarbonyl)benzophenone, 3,3',4,4"-tetrakis(t-butyldioxycarbonyl)benzophenone, 3-phenyl-5-isoxazolone, 2-mercapto benzimidazole, bis(2,4,5-triphenyl)imidazole, 2,2-dimethoxy-1,2-diphenylethane-1-one (product name: Irgacure 651/manufacturer: BASF), 1-hydroxy-cyclohexyl-phenyl-ketone (product name: Irgacure 184/manufacturer: BASF), 2-benzyl-2-dimethylamino-1-(4-morpholinophenyl)-butanone-1 (product name: Irgacure 369/manufacturer: BASF), and bis(η5-2,4-cyclopentadiene-1-yl)-bis(2,6-difluoro-3-(1H-pyrrole-1-yl)-phenyl)titanium (product name: Irgacure 784/manufacturer: BASF), or the like.

The photocationic polymerization initiator may include a diazonium salt, a sulfonium salt, or an iodonium saltm, and examples thereof include sulfonic acid esters, imidosulfonates, dialkyl-4-hydroxysulfonium salts, arylsulfonic acid-p-nitrobenzyl esters, silanol-aluminum complexes, (η6-benzene) (η5-cyclopentadienyl)iron (II), or the like.

In addition, benzoin tosylate, 2,5-dinitrobenzyltosylate, N-tosylphthalic acid imide, or the like can be mentioned.

More specific examples of the photocationic polymerization initiator include commercially available products such as Cyracure UVI-6970, Cyracure UVI-6974 and Cyracure UVI-6990 (manufacturer: Dow Chemical Co. in USA), Irgacure 264 and Irgacure 250 (manufacturer: BASF) or CIT-1682 (manufacturer: Nippon Soda).

In addition, the photopolymer composition of the embodiment may include monomolecular (type I) initiator or bimolecular (type II) initiator.

The (type I) system for free radical photopolymerization may include, for example, an aromatic ketone compounds in combination with a tertiary amine, such as benzophenone, alkylbenzophenone, 4,4'-bis(dimethylamino)benzophenone (Michler's ketone), anthrone and halogenated benzophenone or a mixture of these types.

The bimolecular (type II) initiator may include benzoin and derivatives thereof, benzyl ketal, acylphosphine oxide, for example, 2,4,6-trimethylbenzoyldiphenylphosphine oxide, bisacylophosphine oxide, phenylglyoxyl ester, camphorquinone, alpha-aminoalkylphenone, alpha-dialkoxyacetophenone, 1-[4-(phenylthio)phenyl]octane-1,2-dione 2-(O-benzoyloxime), alpha-hydroxyalkylphenone, and the like.

The photopolymer composition may include 20% to 80% by weight of the polymer matrix or a precursor thereof; 10% to 70% by weight of the photoreactive monomer; and 0.1% to 15% by weight of the photoinitiator, and may include 30% to 70% by weight of the polymer matrix or a precursor thereof; 20% to 60% by weight of the photoreactive monomer; and 0.1% to 10% by weight of the photoinitiator.

When the photopolymer composition further includes an organic solvent as described hereinafter, the content of the above-mentioned components is based on the sum of the above-mentioned components (the sum of the components excluding the organic solvent).

Meanwhile, the photopolymer composition may further include a photosensitizing dye.

The photosensitizing dye serves as photosensitizing pigment to sensitize the photoinitiator. More specifically, the photosensitizing dye may be stimulated by the light irradiated on the photopolymer composition and may also serve as an initiator to initiate polymerization of the monomer and the crosslinking monomer.

The photopolymer composition may contain 0.01% to 30% by weight, or 0.05% to 20% by weight of the photosensitizing dye.

Examples of the photosensitizing dye are not particularly limited, and various compounds commonly known in the art can be used.

Specific examples of the photosensitizing dye include sulfonium derivative of ceramidonine, new methylene blue, thioerythrosine triethylammonium, 6-acetylamino-2-methylceramidonin, eosin, erythrosine, rose bengal, thionine, basic yellow, Pinacyanol chloride, Rhodamine 6G, Gallocyanine, ethyl violet, Victoria blue R, Celestine blue, Quinaldine Red, Crystal Violet, Brilliant Green, Astrazon orange G, Darrow Red, Pyronin Y, Basic Red 29, pyrylium iodide, Safranin O, Cyanine, Methylene Blue, Azure A, or a combination of two or more thereof.

The photopolymer composition may further include an organic solvent.

Non-limiting examples of the organic solvent include ketones, alcohols, acetates ethers, and mixtures of two or more thereof.

Specific examples of such organic solvent include ketones such as methyl ethyl ketone, methyl isobutyl ketone, acetylacetone or isobutyl ketone; alcohols such as methanol, ethanol, n-propanol, i-propanol, n-butanol, i-butanol or t-butanol; acetates such as ethyl acetate, i-propyl acetate, or polyethylene glycol monomethyl ether acetate; ethers such as tetrahydrofuran or propylene glycol monomethyl ether; or a mixture of two or more thereof.

The organic solvent may be added at the time of mixing the respective components contained in the photopolymer composition, or may be contained in the photopolymer composition while adding the respective components in a state of being dispersed or mixed in an organic solvent.

When the content of the organic solvent in the photopolymer composition is too low, the flowability of the photopolymer composition may be lowered, resulting in the occurrence of defects such as the occurrence of striped patterns on the finally produced film.

In addition, when too much organic solvent is added, the solid content is lowered, and the coating and film formation are not sufficient, so that the physical properties and surface characteristics of the film may be deteriorated and defects may occur during the drying and curing process.

Thus, the photopolymer composition may include an organic solvent such that the total solid content concentration of the components contained is 1% to 70% by weight, or 2% to 50% by weight.

The photopolymer composition may further include other additives, catalysts, and the like.

For example, the photopolymer composition may include a catalyst which is commonly known for promoting polymerization of the polymer matrix or photoreactive monomer.

Examples of the catalyst include tin octanoate, zinc octanoate, dibutyltin dilaurate, dimethylbis[(1-oxoneodecyl)oxy]stannane, dimethyltin dicarboxylate, zirconium bis(ethylhexanoate), zirconium acetylacetonate, or tertiary amines such as 1,4-diazabicyclo[2.2.2]octane, diazabicyclononane, diazabicyclo undecane, 1,1,3,3-tetramethylguanidine, 1,3,4,6,7,8-hexahydro-1-methyl-2H-pyrimido(1,2-a)pyrimidine, and the like.

Meanwhile, according to another embodiment of the present invention, a hologram recording medium produced from the photopolymer composition can be provided.

As described above, when the photopolymer composition of one embodiment is used, it is possible to provide holograms capable of achieving a significantly improved refractive index modulation value and a high diffraction efficiency while having a thinner thickness, as compared with holograms previously known in the art.

The hologram recording medium can realize a refractive index modulation value ($\Delta n$) of 0.009 or more, or 0.010 or more even at a thickness of 5 µm to 30 µm.

Further, the hologram recording medium may have a diffraction efficiency of 59% or more, or 85% or more at a thickness of 5 µm to 30 µm.

In the photopolymer composition of the one embodiment, the respective components contained therein are homogeneously mixed, dried and cured at a temperature of 20° C. or higher, and then predetermined exposure procedures were undertaken, thereby producing a hologram for optical application in the entire visible range and the near ultraviolet region (300 to 800 nm).

In the photopolymer composition of the one embodiment, the remaining components excluding the compound containing at least one isocyanate group of forming a polymer matrix or the precursor thereof are first homogeneously mixed. Subsequently, the compound containing at least one isocyanate group can be mixed with the catalyst to prepare holograms.

In the photopolymer composition of one embodiment, a mixing device, a stirrer, a mixer, or the like which are commonly known in the art can be used for mixing the respective components contained therein without particular limitation. The temperature in the mixing process can be 0° C. to 100° C., preferably 10° C. to 80° C., particularly preferably 20° C. to 60° C.

Meanwhile, the remaining components excluding the compound containing at least one isocyanate group of forming a polymer matrix or the precursor thereof in the photopolymer composition of one embodiment are first homogenized and mixed. Subsequently, at the time of adding the compound containing at least one isocyanate group, the photopolymer composition can be a liquid formulation that is cured at a temperature of 20° C. or more.

The curing temperature may vary depending on the composition of the photopolymer and the curing is promoted, for example, by heating at a temperature of from 30° C. to 180° C., preferably from 40° C. to 120° C., particularly preferably from 50° C. to 100° C.

At the time of curing, the photopolymer may be in state of being injected into or coated onto a predetermined substrate or mold.

Meanwhile, as the method of recording a visual hologram on a hologram recording medium produced from the photopolymer composition, generally known methods can be used without particular limitation. The method described in the holographic recording method of the embodiment described hereinafter can be adopted as one example.

Meanwhile, according to another embodiment of the invention, there may be provided a holographic recording method which comprises selectively polymerizing photoreactive monomers contained in the photopolymer composition using an electromagnetic radiation.

As described above, through the process of mixing and curing the photopolymer composition, it is possible to produce a medium in a form in which no visual hologram is recorded, and a visual hologram can be recorded on the medium through a predetermined exposure process.

A visual hologram can be recorded on the media provided through the process of mixing and curing the photopolymer composition, using known devices and methods under commonly known conditions.

Meanwhile, according to another embodiment of the invention, an optical element including a hologram recording medium can be provided.

Specific examples of the optical element include optical lenses, mirrors, deflecting mirrors, filters, diffusing screens, diffraction elements, light guides, waveguides, holographic optical elements having projection screen and/or mask functions, medium of optical memory system and light diffusion plate, optical wavelength multiplexers, reflection type, transmission type color filters, and the like.

An example of an optical element including the hologram recording medium may include a hologram display device.

The hologram display device includes a light source unit, an input unit, an optical system, and a display unit.

The light source unit is a portion that irradiates a laser beam used for providing, recording, and reproducing three-dimensional image information of an object in the input unit and the display unit.

Further, the input unit is a portion that previously inputs three-dimensional image information of an object to be recorded on the display unit, and for example, three-dimensional information of an object such as the intensity and phase of light for each space can be inputted into an electrically addressed liquid crystal SLM, wherein an input beam may be used.

The optical system may include a mirror, a polarizer, a beam splitter, a beam shutter, a lens, and the like. The optical system can be distributed into an input beam for sending a laser beam emitted from the light source unit to the input unit, a recording beam for sending the laser beam to the display unit, a reference beam, an erasing beam, a reading beam, and the like.

The display unit can receive three-dimensional image information of an object from an input unit, record it on a hologram plate comprising an optically addressed SLM, and reproduce the three-dimensional image of the object.

In this case, the three-dimensional image information of the object can be recorded via interference of the input beam and the reference beam.

The three-dimensional image information of the object recorded on the hologram plate can be reproduced into a three-dimensional image by the diffraction pattern generated by the reading beam. The erasing beam can be used to quickly remove the formed diffraction pattern.

Meanwhile, the hologram plate can be moved between a position at which a three-dimensional image is inputted and a position at which a three-dimensional image is reproduced.

Advantageous Effects

According to the present invention, there can be provided a photopolymer composition which can more easily provide a photopolymer layer having remarkably improved refractive index modulation value and high diffraction efficiency while having a thin thickness, a hologram recording medium comprising the same, a hologram recording medium comprising a photopolymer layer having remarkably improved refractive index modulation value and high diffraction efficiency while having a thin thickness, an optical element comprising the hologram recording medium, and a holographic recording method comprising selectively polymerizing photoreactive monomers contained in the photopolymer composition using an electromagnetic radiation.

BRIEF DESCRIPTION OF THE DRAWINGS

FIG. 1 shows 1H NMR data of the polyrotaxane polymer [A1000] that is used as a reactant in Examples.

FIG. 2 shows a gCOSY NMR spectrum confirming the structure of caprolactone contained in the polyrotaxane polymer [A1000] that is used as a reactant in Examples.

DETAILED DESCRIPTION OF THE EMBODIMENTS

Hereinafter, the present invention will be described in more detail by way of the following examples.

However, these examples are given for illustrative purposes only and are not intended to limit the scope of the present invention thereto.

Example and Comparative Example: Preparation of Photopolymer

As shown in Table 1 below, polyrotaxane polymer [A1000, Advanced Soft Material Inc.], photoreactive monomer, Safranin O (dye, manufactured by Sigma-Aldrich), N-methyldiethanolamine (Sigma-Aldrich), [4-methylphenyl-(4-(2-methylpropyl)phenyl)]iodonium hexafluorophosphate (Irgacure 250) and methyl isobutyl ketone (MIBK) was mixed in a state of cutting off light, and stirred with a paste mixer for about 2 minutes to obtain a transparent coating solution.

1H NMR data of the polyrotaxane polymer [A1000] that was used as a reactant is shown in FIG. 1, and the structure of the caprolactone bonded to the macrocycle of polyrotaxane was confirmed through the gCOSY NMR spectrum of FIG. 2.

MFA-75X (Asahi Kasei, hexafunctional isocyanate, diluted to 75 wt % in xylene) was added to the coating solution and further stirred for 1 minute. 1.1 g of DBTDL (diluted to 1% solids) as a catalyst was added thereto, stirred for about 1 minute, coated in a thickness of 20 μm onto a polycarbonate (PC) substrate (125 μm) using a Meyer bar, and cured at 40° C. for 30 minutes.

Then. the sample was allowed to stand for 12 hours or more in a dark room under constant temperature and humidity conditions of about 25° C. and 50% RH.

Experimental Example: Holographic Recording (1) The photopolymer-coated surfaces prepared in each of Examples and Comparative Examples were laminated on a slide glass, and fixed so that a laser first passed through the glass surface at the time of recording.

(2) A holographic recording was done via interference of two interference lights (reference light and object light), and the transmission-type recording was done so that the two beams were incident on the same side of the sample.

The diffraction efficiencies are changed according to the incident angle of the two beams, and become non-slanted when the incident angles of the two beams are the same.

In the non-slanted recording, the diffraction grating is generated vertically to the film because the incident angles of the two beams are the same on the normal basis.

The recording (2θ=45°) was done in a transmission-type non-slanted manner using a laser with a wavelength of 532 nm, and the diffraction efficiency (η) was calculated according to the following Equation 1.

$$\eta = \frac{P_D}{P_D + P_T} \qquad \text{[Equation 1]}$$

in Equation 1, η is a diffraction efficiency, $P_D$ is an output amount (mW/cm$^2$) of the diffracted beam of a sample after recording, and $P_T$ is an output amount (mW/cm$^2$) of the transmitted beam of the recorded sample.

The lossless dielectric grating of the transmission-type hologram can calculate the refractive index modulation value (Δn) from the following Equation 2.

$$\eta(DE) = \sin^2\left(\sqrt{v^2}\right) = \sin^2\left(\frac{\pi \Delta n d}{\lambda \cos\theta}\right) \qquad \text{[Equation 2]}$$

in Equation 2, d is a thickness of the photopolymer layer, Δn is a refractive index modulation value, η(DE) is a diffraction efficiency, and λ is a recording wavelength.

TABLE 1

Measurement Results of Diffraction Efficiency and Refractive Index Modulation Value (Δn) of Photopolymer Compositions of Examples and Holographic Recording Medium Prepared Therefrom

|  |  | Example 1 | Example 2 | Example 3 | Example 4 |
|---|---|---|---|---|---|
| Compound used | Polyrotaxane polymer [A1000] | 10 | 10 | 10 | 10 |
|  | Erythritol |  |  | 0.25 | 0.5 |
|  | Polyol 1 |  |  |  |  |
|  | Polyol 2 |  |  |  |  |
|  | Polyol 3 |  |  |  |  |
|  | MFA-75X | 4.3 | 5.9 | 6.2 | 8.0 |
|  | HR6042 | 8.8 | 9.6 | 9.9 | 11.0 |
|  | Safranine O | 3.1 | 3.4 | 3.5 | 3.8 |
|  | N-methyl-diethanolamine | 4.9 | 5.4 | 5.5 | 6.2 |
|  | Irgacure 250 | 1.4 | 1.5 | 1.5 | 1.7 |
|  | MIBK | 60 | 66 | 67 | 73 |
| Coating thickness |  | 20 | 20 | 20 | 20 |
| Diffraction efficiency (η, %) |  | 95 | 92 | 90 | 87 |
| Δn |  | 0.01 | 0.01 | 0.01 | 0.009 |

TABLE 2

Measurement Results of Diffraction Efficiency and Refractive Index Modulation Value (Δn) of Photopolymer Compositions of Comparative Examples and Holographic Recording Medium Prepared Therefrom

|  |  | Comparative Example 1 | Comparative Example 2 | Comparative Example 3 |
|---|---|---|---|---|
| Compound used | Polyrotaxane polymer [A1000] |  |  |  |
|  | Erythritol |  |  |  |
|  | Polyol 1 | 10 |  |  |
|  | Polyol 2 |  | 10 |  |
|  | Polyol 3 |  |  | 10 |
|  | MFA-75X | 5.4 | 22.3 | 5.9 |
|  | HR6042 | 9.4 | 17.8 | 9.6 |
|  | Safranine O | 3.3 | 6.2 | 3.4 |
|  | N-methyl-diethanolamine | 5.2 | 10 | 5.4 |
|  | Irgacure 250 | 1.4 | 2.8 | 1.5 |
|  | MIBK | 64 | 119 | 66 |
| Coating thickness |  | 20 | 20 | 20 |
| Diffraction efficiency (η, %) |  | 78 | 50 | 75 |
| Δn |  | 0.008 | 0.006 | 0.008 |

A1000: polyrotaxane, OH equivalent weight=779 g/mol, Mw=600,000 g/mol, product available at ASMI (Advanced Softmaterial Inc.), Japan.

MFA-75X: hexane diisocyanate-based polyisocyanate, NCO content=13.7%, product available at Needfill.

Polyol 1: Polycaprolactone diol (bifunctional polyol), OH equivalent weight=625 g/mol.

Polyol 1: PEG-diol (polyethyleneglycol diol), OH equivalent weight=150 g/mol.

Polyol 3: 7341-X65 product available at Needfill, OH equivalent weight=567 g/mol.

HR6042: bifunctional acrylate, product available at Miwon Specialty Chemical Co., Ltd.

DBTDL: product available at Sigma-Aldrich, a urethanization catalyst. Dibutyl tin dilaurate.

Irganox 250: [4-methylphenyl-(4-(2-methylpropyl)phenyl)]iodonium hexafluorophosp As shown in Tables 1 and 2 above, it was confirmed that the photopolymer compositions including the polymer matrix using a polyol including a polyrotaxane compound can provide a hologram achieving a high diffraction efficiency of about 85% or more together with a high refractive index modulation value compared to Comparative Examples.

In addition, when the degree of crosslinking of the hologram is further increased by using a polyol of erythritol together with a polyrotaxane compound, it was confirmed that the cross-link point can move in the polymer matrix of the hologram, and that it the hologram has a higher refractive index modulation value and diffraction efficiency than the hologram of Comparative Examples.

The invention claimed is:

1. A photopolymer composition comprising:
   a polymer matrix or a precursor thereof including a reaction product of a polyol and a compound containing at least two isocyanate groups, wherein the polyol includes a polyrotaxane compound comprising a cyclic compound to which a lactone-based compound is bonded, a linear molecule penetrating the cyclic compound, and a blocking group arranged at both ends of the linear molecule, and wherein the blocking group prevents the cyclic compound from escaping;
   a photoreactive monomer; and
   a photoinitiator,
   wherein the compound containing at least two isocyanate groups includes an aliphatic, cycloaliphatic, aromatic or aromatic-aliphatic di-isocyanate, tri-isocyanate or poly-isocyanate; or oligo-isocyanate or poly-isocyanate of diisocyanate or triisocyanate having urethane, urea, carbodiimide, acylurea, isocyanurate, allophanate, biuret, oxadiazinetrione, uretdione or iminooxadiazinedione structures,
   wherein the photoreactive monomer includes a polyfunctional (meth)acrylate monomer or a monofunctional (meth)acrylate monomer, and
   wherein the polymer matrix or the precursor thereof is present in an amount of 20% to 80% by weight, the photoreactive monomer is present in an amount of 20% to 60% by weight, and the photoinitiator is present in an amount of 0.1% to 15% by weight.

2. The photopolymer composition of claim 1, wherein the lactone-based compound includes a lactone-based compound having 3 to 12 carbon atoms or a polylactone-based compound containing a lactone-based repeating unit having 3 to 12 carbon atoms.

3. The photopolymer composition of claim 1, wherein the lactone-based compound is directly bonded to the cyclic compound, or is bonded to the cyclic compound via a linear or branched oxyalkylene group having 1 to 10 carbon atoms.

4. The photopolymer composition of claim 1,
   wherein the cyclic compound includes at least one selected from the group consisting of α-cyclodextrin, β-cyclodextrin and γ-cyclodextrin,
   wherein the linear molecule is a polyoxyalkylene-based compound or a polylactone-based compound, and wherein the blocking group includes at least one functional group selected from the group consisting of a dinitrophenyl group, a cyclodextrin group, an adamantane group, a trilyl group, a fluorescein group, and a pyrene group.

5. The photopolymer composition of claim 1, wherein the polyrotaxane compound has a weight average molecular weight of 100,000 to 800,000.

6. The photopolymer composition of claim 1, wherein the polyol including the polyrotaxane compound further includes at least one selected from the group consisting of aliphatic aromatic diols, triols or polyols having 2 to 20 carbon atoms; alicyclic diols, triols or polyols having from 4 to 30 carbon atoms and aromatic diols, triols or polyols having 6 to 30 carbon atoms.

7. The photopolymer composition of claim 1, further comprising a photosensitizing dye.

8. A hologram recording medium produced from the photopolymer composition of claim 1.

9. An optical element comprising the hologram recording medium of claim 8.

10. A holographic recording method comprising selectively polymerizing photoreactive monomers contained in the photopolymer composition of claim 1 using an electromagnetic radiation.

11. The hologram recording medium of claim 8, wherein the hologram recording medium has a refractive index modulation value ($\Delta n$) of 0.009 or more and a diffraction efficiency of 85% or more at a thickness of 5 μm to 30 μm.

* * * * *